July 17, 1923.
J. G. VINCENT
1,461,990
HYDROCARBON MOTOR
Filed Nov. 22, 1915
2 Sheets-Sheet 2
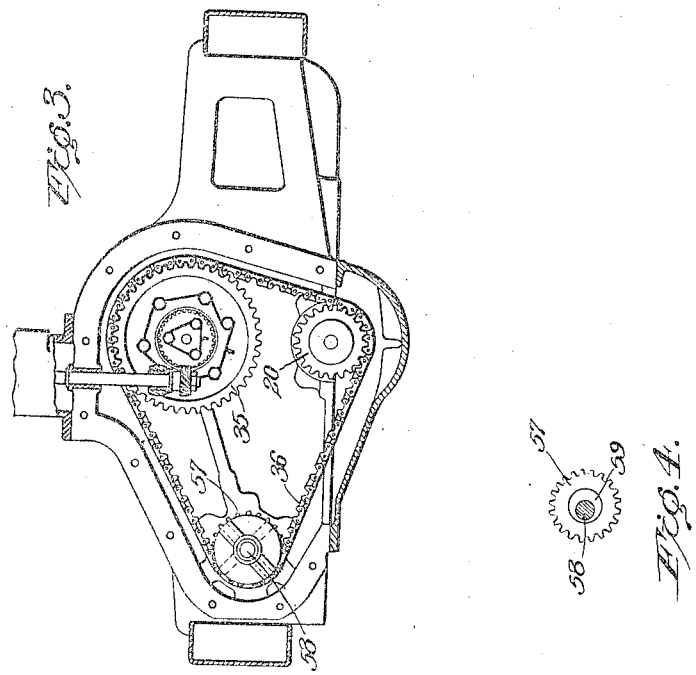
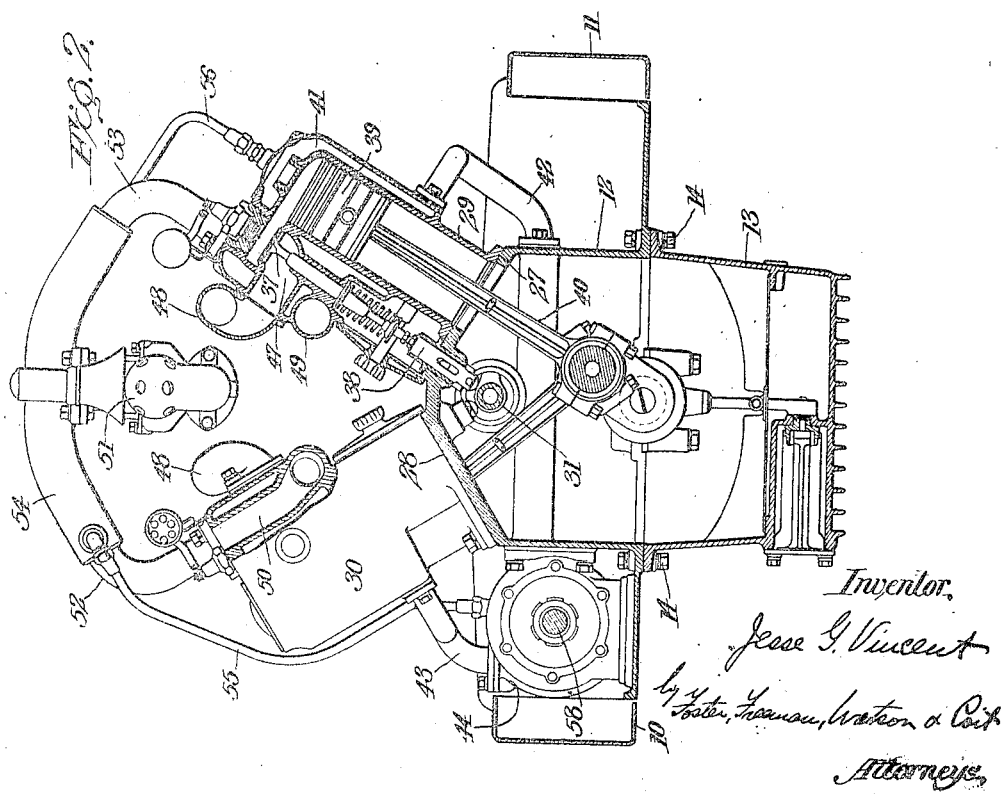
Inventor,
Jesse G. Vincent
by Foster, Freeman, Watson & Coit
Attorneys Patented July 17, 1923.

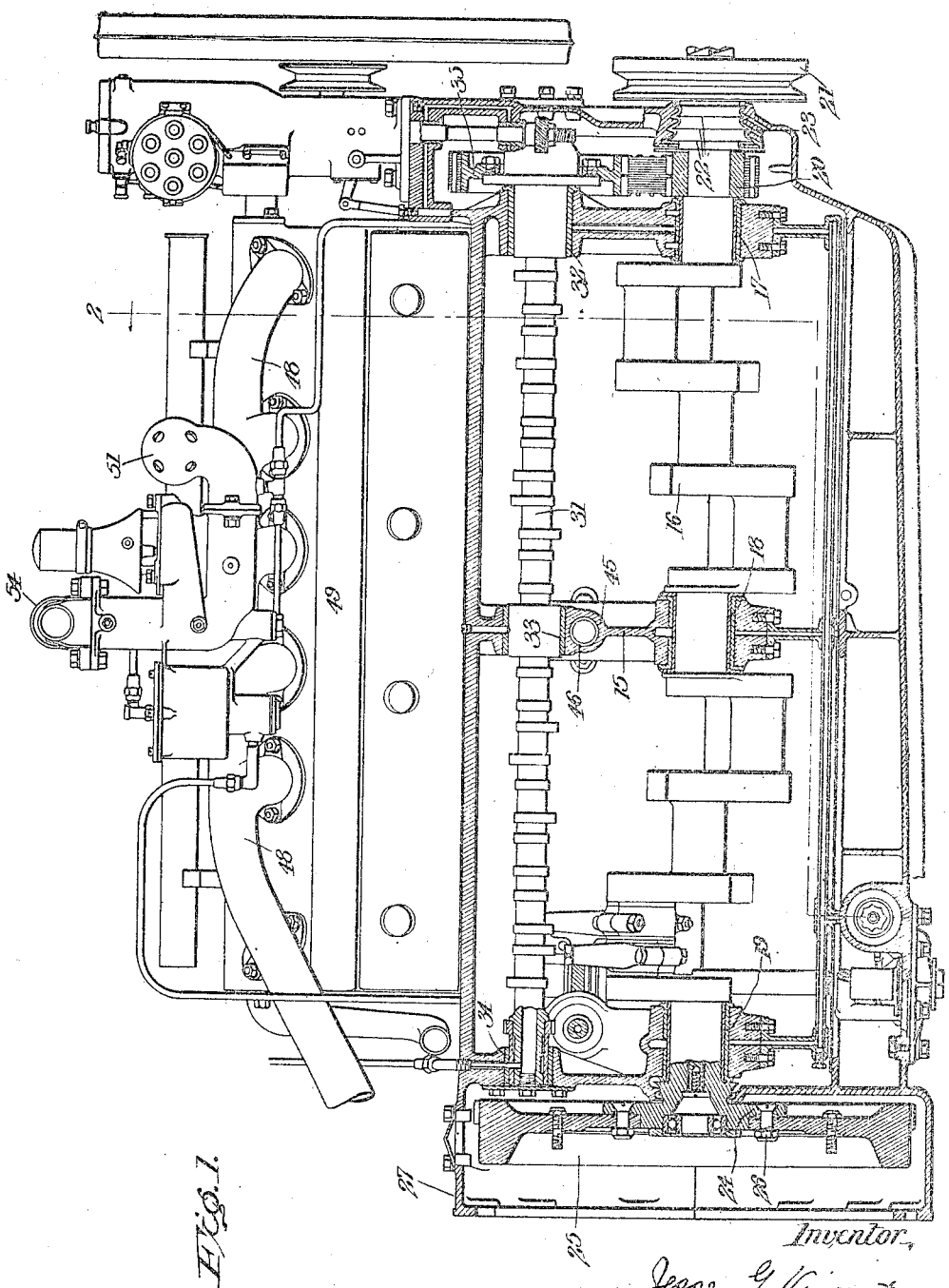

1,461,990

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed November 22, 1915. Serial No. 62,796.

*To all whom it may concern:*

Be it known that I, JESSE G. VINCENT, a citizen of the United States, residing at Detroit, Wayne County, State of Michigan, have invented certain new and useful Improvements in Hydrocarbon Motors, of which the following is a specification.

This invention relates to hydrocarbon motors and more particularly to certain features of multicylinder motors in which the cylinders are in V relation.

One of the objects of the invention is to provide a multi-cylinder motor having cylinders in V relation, in which the axes of the valves are arranged at an angle to the axes of their respective cylinders so as to provide for actuating all of the valves from a single cam shaft. It is also an object of the invention to so arrange the various surfaces of the cylinders, which must be machined, that the machining of the cylinders may be accomplished in the most expeditious manner and at the minimum cost.

A further object is to provide an arrangement of the intake passage or conduit to the several cylinders whereby many of the usual joints are eliminated, the passage positioned so that it is maintained at a substantially uniform temperature and the conduit leading from the carburetor to the passage or intake manifold in the blocks is secured to the top of the blocks, thus leaving a free alley in the V between the blocks.

Other objects and the features of novelty will be apparent from the following description taken in connection with the accompanying drawings in which, Figure 1 is a central longitudinal section through a motor embodying my invention;

Figure 2 is a transverse section taken substantially on the line 2—2 of Figure 1, certain parts being shown in end elevation;

Figure 3 is an elevation of the driving mechanism for the cam and auxiliary shafts, and Figure 4 is a detail section of the chain adjusting device.

Referring to the drawings, 10 and 11 indicate the side frames of a motor vehicle on which there is supported the upper portion 12 of the crank case. The lower portion 13 of the crank case constitutes the usual oil reservoir and is secured to the upper portion 12 by means of suitable bolts 14. The crank case has a transverse partition 15 extending across the interior substantially mid-way of its length. A crank shaft 16 is mounted in bearings 17, 18 and 19 in the crank case, these bearings being preferably arranged at the joint between the sections 12 and 13 so that the shaft may be easily removed by detaching the lower portions 13 of the crank case. At its forward end the crank shaft 16 carries a sprocket wheel 20 and a belt pulley 21. Between the sprocket and the belt pulley the shaft is provided with a series of flanges 22 which are adapted to prevent oil from escaping along the shaft, these flanges throwing the oil upwardly into suitable pockets 23 which surround the flanges. At its rearward end the crank shaft is provided with a flange 24 to which a flywheel 25 is secured by the bolts 26. The flywheel is arranged in an extension 27 of the crank case.

The upper side of the upper part 12 of the crank case has its opposite sides inclined as shown at 27 and 28, the surfaces 27 and 28 being machined to receive the cylinders 29 and 30, respectively. The motor illustrated has twelve cylinders arranged in groups of six cylinders each, formed integrally and independently secured on the surfaces 27 and 28.

A cam shaft 31 is mounted in bearings 32, 33 and 34 in the part 12 of the crank case and carries at its forward end a sprocket wheel 35 which is in alinement with the sprocket wheel 20 and driven from the latter by means of a silent chain 36. From Fig. 2 it will be seen that the cam shaft 31 is arranged in the angle between the two groups of cylinders and directly over the crank shaft 16. Each of the cylinders is provided with the usual inlet and exhaust valve, one of which is shown in Fig. 2 at 37. Each valve is actuated by a push rod 38 which extends into the crank case and is, in turn, actuated by a cam on the shaft 31. Each of the cams on the shaft 31 actuates one valve. The axes of the valves in the cylinders 29 are normal to the surface 27 but are at an angle to the axes of the cylinders 29, the latter axes intersecting the axis of the crank shaft 16. The axes of all of the valves of the two groups of cylinders intersect the axis of the cam shaft 31 and this shaft being above the shaft 16 it is apparent that the angle included between the valves of the two groups of cylinders is greater than the angle included between the axes of the two groups of cylinders. As shown in Figure 2, the valve 37 is tilted slightly toward the bore of the cylinder and thus reduces the amount of clearance space which would otherwise be normally present. In order to reduce the cost of machining the cylinder blocks to a minimum, all machined surfaces, except the cylinder bore, are parallel or normal to the axes of the valves.

Each cylinder has arranged therein a piston 39 which is operatively connected with the crank shaft 16 by a connecting rod 40. The cylinders have the usual water jackets 41 which, in the case of the cylinders 29, are supplied by means of a pipe 42 and in the case of the cylinders 30 by a pipe 43. These pipes are supplied from a pump 44 located adjacent the frame 10, as shown in Figure 2. The pipe 42 has connection with the pump 44 by means of a conduit 45, which is formed in the partition 15. In order to prevent the water from escaping from the conduit 45 into the crank case, in case the walls of the conduit happen to be more or less porous, the conduit is provided with an impervious liner 46, which at one end has connection with the pump 44 and at its other end has connection with the pipe 42.

The valve 37 controls an exhaust port of the cylinder 29 and an exhaust passage 47 extends from each of the exhaust valves to an exhaust manifold 48, which is bolted to the inner side of the cylinder block. Each of the blocks of cylinders has one of these exhaust manifolds as clearly shown in Fig. 2. An intake manifold 49 is formed integral with and on the inner side of each of the blocks of cylinders and passages extend from these manifolds to each of the inlet valves. The manifolds 49 are supplied by means of a conduit 50 extending downwardly from the top of the block of cylinders at about the middle of the length thereof. The passages 50 in the cylinder blocks are supplied with a combustible mixture from a carburetor 51 by means of conduits 52 and 53, bolted to the top of the blocks and are preferably provided with a water jacket 54. The jacket 54 may be supplied with water from the cylinder jacket by means of a pipe 56 and the water is discharged from the opposite end of the jacket 54 through a pipe 55 into the suction side of the pump 44.

The means for driving the cam shaft, pump, etc., includes a chain at the front of the motor.

Referring to Fig. 3 it will be seen that the chain 36 passes over a sprocket wheel 57 which is arranged at one side of the plane common to the axes of the shafts 16 and 31. The sprocket wheels 20, 35 and 57 are thus arranged in a triangle and in order to take up the slack in the chain 36 one of the sprockets is made laterally adjustable. This is accomplished by having the sprocket 57 rotatably arranged on an eccentric bushing 59 which may be angularly adjusted about the shaft 58, as shown in Fig. 4. An Oldham or other universal coupling may be used to connect the sprocket 57 to drive the shaft 58. The tension on the chain 36 may be adjusted by turning the eccentric 59 about the shaft 58 and in this way it is possible to vary the tension without moving the shaft 58 laterally.

It will be evident that changes may be made in the details of construction without departing from the spirit of the invention, which is defined in the appended claims and therefore I do not wish to be limited to the details shown and described.

Having thus described the invention, what is claimed and desired to be secured by Letters Patent is:

1. In a multi-cylinder hydrocarbon motor, in combination, a motor base, cylinder blocks in V arrangement thereon, and valves for the cylinders also in V arrangement but at a slightly greater acute angle to each other than the cylinders.

2. In a multi-cylinder hydrocarbon motor, in combination, a motor base, cylinder blocks in V arrangement thereon, valves for the cylinders also in V arrangement but at a slightly greater acute angle to each other than the cylinders, said valves being located between the cylinder blocks, and a cam shaft for operating the valves of both cylinder blocks.

3. In a hydrocarbon motor, in combination, a supporting base, a pair of cylinder blocks disposed in V relation, each block having a plurality of cylinders with their valves on adjacent sides of the blocks and with intake conduits formed in the adjacent side walls of the blocks and extending to all of the cylinders of each block, a carbureter arranged between the blocks, and a conduit of arched form communicating with said carbureter and the first mentioned conduits and detachably secured to said blocks.

4. In a hydrocarbon motor, in combination, a supporting base, a pair of cylinder blocks in V relation each block having a plurality of cylinders with their valves on adjacent sides of the blocks and with intake conduits formed in the adjacent side walls of the blocks and extending to all of the cylinders of each block, a carbureter arranged between the blocks, and a conduit communicating with said carbureter and with the first mentioned conduits through the tops of said blocks.

5. In a hydrocarbon motor, in combination, a supporting base, a pair of cylinder blocks in V relation, each block having a plurality of cylinders with their valves on adjacent sides of the blocks and with intake conduits in the walls of the blocks and extending to all of the cylinders of each block, and separate exhaust conduits detachably secured on the adjacent sides of the blocks.

In testimony whereof I affix my signature.

JESSE G. VINCENT.